(12) United States Patent
Saha et al.

(10) Patent No.: US 7,947,620 B2
(45) Date of Patent: May 24, 2011

(54) MULLITE BODIES AND METHODS OF FORMING MULLITE BODIES

(75) Inventors: Chandan Saha, W. Bloomfield, MI (US); Aleksander Jozef Pyzik, Midland, MI (US); Sten Wallin, Midland, MI (US); Arthur M. Prunier, Midland, MI (US); Clifford S. Todd, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 320 days.

(21) Appl. No.: 12/179,963

(22) Filed: Jul. 25, 2008

(65) Prior Publication Data

US 2008/0293564 A1  Nov. 27, 2008

Related U.S. Application Data

(62) Division of application No. 10/477,833, filed as application No. PCT/US03/09147 on Mar. 24, 2003, now Pat. No. 7,425,297.

(60) Provisional application No. 60/367,540, filed on Mar. 25, 2002.

(51) Int. Cl.
| | |
|---|---|
| C04B 35/00 | (2006.01) |
| C04B 38/00 | (2006.01) |
| C04B 33/32 | (2006.01) |
| C04B 33/36 | (2006.01) |
| B28B 1/00 | (2006.01) |
| B28B 5/00 | (2006.01) |

(52) U.S. Cl. ......... 501/128; 501/80; 264/629; 264/630; 264/631

(58) Field of Classification Search .............. 501/80, 501/128; 264/629–631, 645; 210/510.1
See application file for complete search history.

(56) References Cited

U.S. PATENT DOCUMENTS

| | | | |
|---|---|---|---|
| 4,293,357 A | 10/1981 | Higuchi et al. | |
| 4,304,585 A | 12/1981 | Oda et al. | |
| 4,559,193 A | 12/1985 | Ogawa et al. | |
| 4,608,357 A | 8/1986 | Silverman et al. | |
| 4,628,042 A | 12/1986 | Speronello | |
| 4,893,465 A | 1/1990 | Farrauto et al. | |
| 4,910,172 A | 3/1990 | Talmy et al. | |
| 4,911,902 A | 3/1990 | Talmy et al. | |
| 4,948,766 A | 8/1990 | Talmy et al. | |
| 5,098,455 A | 3/1992 | Doty et al. | |
| 5,145,806 A | 9/1992 | Shirakawa et al. | |
| 5,173,349 A | 12/1992 | Yavuz et al. | |
| 5,194,154 A | 3/1993 | Moyer et al. | |
| 5,198,007 A | 3/1993 | Moyer et al. | |
| 5,252,272 A | 10/1993 | Yavuz et al. | |
| 5,294,576 A | 3/1994 | Mizushima et al. | |
| 5,340,516 A | 8/1994 | Yavuz et al. | |
| 5,437,933 A | 8/1995 | Coupland et al. | |
| 5,504,051 A | 4/1996 | Nakamura | |
| 6,306,335 B1 | 10/2001 | Wallin et al. | |
| 7,485,594 B2 * | 2/2009 | Saha et al. | .................... 501/128 |

FOREIGN PATENT DOCUMENTS

| | | |
|---|---|---|
| DE | 3437641 A1 | 4/1985 |
| JP | 59039782 | 3/1984 |
| JP | 63103877 | 5/1988 |
| JP | 03141181 | 6/1991 |
| JP | 03150276 | 6/1991 |
| JP | 0465372 | 3/1992 |
| JP | 0478447 | 3/1992 |
| JP | 4193782 | 7/1992 |
| JP | 558618 | 3/1993 |
| JP | 05317727 | 12/1993 |
| WO | WO03/082773 | 10/2003 |

OTHER PUBLICATIONS

Jae-Ean Lee et al. Ceramics International, "Effects of precursor $_pH$ and sintering temperature on synthesizing and morphology of sol-gel processed mullite".
J. R. Moyer et al., J. Am. Ceram. Soc., 77(4)1083-86 (1994) "A Catalytic Process for Mullite Whiskers", pp. 1083-1085.
J. R. Moyer, J. Am. Ceram. Soc., 78(12)3253-58(1995) "Phase Diagram for Mullite-SiF$_4$", pp. 3253-3258.
J. R. Moyer et al., J. Am. Ceram. Soc., 771 (4)1083-86 (1994) "Stoichiometry of Fluorotopaz and of Mullite Made from Fluorotopaz" pp. 1087-1089.
Heon-Jin Choi et al., J. Am. Ceram. Soc., 85(2) 481-83 (2002) "Synthesis of Mullite Whiskers", pp. 481-483.
Hyunho Shin et al: Mullitization from a multicomponent oxide system in the temperature range 1200 [deg.]-1500 [deg.]C; Journal of the American Ceramic Society, Abstract.

\* cited by examiner

Primary Examiner — Anthony J Green
Assistant Examiner — Pegah Parvini
(74) Attorney, Agent, or Firm — Kevin J. Nilsen

(57) ABSTRACT

A method of forming a porous mullite composition of acicular mullite grains having improved properties is described, where the mullite is formed at some time in the presence of a fluorine containing gas. For example, it has been discovered that improved properties may result from heating the mullite to a high temperature in an atmosphere selected from the group consisting of water vapor, oxygen, an inert gas or mixtures thereof or forming the mullite composition from precursors having an Al/Si ratio of at most 2.95.

24 Claims, No Drawings ial application Ser. No. 10/477,833, filed Sep. 16, 2004, now U.S. Pat. No. 7,425,297 which is a 371 of International Patent Application PCT/US03/09147, filed Mar. 24, 2003 which claims the benefit of U.S. Provisional application Ser. No. 60/367,540, filed Mar. 25, 2002.

MULLITE BODIES AND METHODS OF FORMING MULLITE BODIES

This Divisional application claims the benefit of U.S. patent application Ser. No. 10/477,833, filed Sep. 16, 2004, now U.S. Pat. No. 7,425,297 which is a 371 of International Patent Application PCT/US03/09147, filed Mar. 24, 2003 which claims the benefit of U.S. Provisional application Ser. No. 60/367,540, filed Mar. 25, 2002.

The invention relates to mullite bodies and methods of forming mullite bodies. In particular, the invention relates to mullite bodies having fused interlocked acicular grains and a method of forming them.

Recently more stringent regulation of particulate matter emitted by diesel engines has been passed in Europe and the United States. To meet these regulations, it is expected that particulate filters will be necessary.

These particulate filters will have to meet multiple contradictory exacting requirements. For example, the filter must have sufficient porosity (generally greater than 55 percent porosity) while still retaining most of the emitted micrometer sized diesel particulates (generally greater than 90 percent capture of the emitted particulates). The filter must also be permeable enough so that excessive back pressure does not occur too quickly, while still being able to be loaded with a great amount of soot before being regenerated. The filter must withstand the corrosive exhaust environment for long periods of time. The filter must have an initial strength to be placed into a container attached to the exhaust system. The filter must be able to withstand thermal cycling (, retain adequate strength) from the burning off of the soot entrapped in the filter (regeneration) over thousands of cycles where local temperatures may reach as high as 1600° C. From these stringent criteria, ceramic filters have been the choice of material to develop a diesel particulate filter.

Early on, ceramic filters of sintered cordierite were explored as a possible diesel particulate filter. Cordierite was explored because of its low cost and use as a three-way catalyst support in automotive exhaust systems. Unfortunately, cordierite has not displayed the capability of high porosity, high permeability and high soot loading in conjunction with retained strength after thousands of regeneration cycles to satisfy the stringent requirements described above.

More recently, silicon carbide has become of interest as filters because of its high strength and ability to maintain strength after thermal cycling. However, silicon carbide suffers, for example, from having to be sintered at high temperature using expensive fine silicon carbide powder. Because silicon carbide is sintered, the pore structure that develops results in limited soot loading before excessive back pressure develops.

Accordingly, it would be desirable to provide both a formation method and a ceramic material that solves one or more of the problems of the prior art, such as one of those described above.

A first aspect of the present invention is a method for preparing an acicular mullite composition, the method comprising, a) forming a mixture of one or more precursor compounds having the elements present in mullite, wherein one of the precursor compounds is clay, b) shaping the mixture into a porous green shape, c) heating the porous green shape of step (b) under an atmosphere having a fluorine containing gas and to a temperature sufficient to form an untreated mullite composition comprised substantially of acicular mullite grains that are essentially chemically bound and d) subsequently heating the untreated mullite composition to a heat treatment temperature of at least 950° C. under a heat treatment atmosphere selected from the group consisting of water vapor, oxygen, air, an inert gas or mixtures thereof for a time sufficient to form the mullite composition.

Surprisingly, the present method allows the formation of an acicular mullite that has sufficient strength and retains that strength sufficiently to survive the thermal cycling experienced over the life of a vehicle. In contrast, acicular mullite compositions made with clay, but without the heat treatment step of this invention, lose a substantial amount of their untreated strength (that is, strength after above step (c)) after being heated to 800° C. for 2 hours in air.

A second aspect of the invention is a method of forming a porous acicular mullite composition having improved strength comprising, a) forming a mixture of one or more precursor compounds having the elements present in mullite, wherein one of the precursor compounds is clay, wherein the mixture has an Al/Si ratio of at most 2.95, b) shaping the mixture into a porous green shape and c) heating the porous green shape of step (b) under an atmosphere having a fluorine containing gas that is separately provided and to a temperature sufficient to form a porous mullite composition substantially of acicular mullite grains that are essentially chemically bound, wherein the mullite composition has a bulk Al/Si stoichiometry of at most 2.95 to at least 2 and the acicular mullite grains have an Al/Si stoichiometry of at least 2.95 and the mullite composition has at most 2 percent by volume of a crystalline silica phase.

A third aspect of the invention is a porous mullite composition comprised substantially of acicular mullite grains that are essentially chemically bound, wherein the mullite composition has a bulk Al/Si stoichiometry, of at most 2.95 to at least 2, and the acicular mullite grains have an Al/Si ratio of at least 2.95 and the mullite composition has at most 2 percent by volume of a crystalline silica phase and a glassy phase distributed on at least a portion of the mullite grains, wherein the glassy phase is comprised of silica magnesium and iron.

Surprisingly, a composition of the third aspect may have, after being heated to 800° C. in air for 2 hours, a retained strength of at least 15 Mpa, while the composition has a porosity of at least 55 percent to at most 85 percent. The retained strength is the bend strength after the acicular mullite has been heated in air to 800° C. for two hours. These acicular mullite compositions may, if desired, be treated using the last step of the first aspect of the invention to give even further improved retained strengths.

A fourth aspect of the invention is a mullite composition comprised substantially of acicular mullite grains that are essentially chemically bound, wherein the mullite composition has a glassy phase distributed on at least a portion of the acicular mullite grains, said glassy phase having iron and magnesium essentially incorporated into the glassy phase.

It has been discovered that a mullite composition made with precursors, such as clay, containing iron and magnesium impurities result in precipitates of these in the glass phase present in the mullite composition, which appear to lower the strength upon thermal cycling. When using the method of the first aspect of this invention, these precipitates are essentially eliminated by incorporating the magnesium and iron into the glassy phase and are not reformed upon thermal cycling, such as heating in air to 800° C. for 2 hours.

The mullite body of the present invention may be used in any application suitable for mullite. Examples include filters, refractories, thermal and electrical insulators, reinforcement for composite bodies of metals or plastics, catalysts and catalyst supports.

Mullite Composition

The mullite composition is comprised of acicular mullite grains essentially chemically bound. It is desirable that the mullite grains comprise at least 90 percent of the mullite composition. Preferably the mullite grains comprise at least 95 percent, more preferably at least 98 percent, even more preferably at least 99 percent by volume of the composition. The mullite composition, in addition to the mullite grains, almost invariably contains a glassy phase comprised of silica, alumina and metal impurities in the form of oxides. The glassy phase, generally, is situated at the mullite grain surfaces and at intersecting grain surfaces.

Acicular mullite grains are grains that have an aspect ratio of greater than 2 (for example, length twice as great as width). Desirably, the acicular mullite grains present in the mullite composition have an average aspect ratio of at least 5. Preferably, the average aspect ratio is at least 10, more preferably at least 15, even more preferably at least 20 and most preferably at least 40.

Essentially all of the mullite composition's grains are chemically bound to other mullite grains of the body. This means that at most 1 percent by volume of the mullite grains fail to be bound chemically to other mullite grains. Preferably, essentially all of the mullite grains are chemically bound. Chemically bound, generally, is when the grains are sintered or fused together. The fusing and sintering occurs at the grain interfaces, which is generally comprised of an amorphous oxide (glass) phase (that is, disordered phase) of Si, Al or a mixture thereof. As described above, the glassy phase may also contain other metal oxide impurities.

The microstructure may be determined by suitable techniques such as microscopy on a polished section. For example, the average mullite grain size may be determined from a scanning electron micrograph (SEM) of a polished section of the body, wherein the average grain size may be determined by the intercept method described by Underwood in *Quantitative Stereology*, Addison Wesley, Reading, Mass., (1970).

In one preferred embodiment of the invention, the mullite composition has, after being heated to 800° C. in air for 2 hours, a strength of at least 15 MPa and the composition has a porosity of at least 55 percent to at most 85 percent. To reiterate, the strength after being heated in air to 800° C. for 2 hours is referred to herein as the retained strength. The retained strength has been found to be a good indicator of the ability of the composition to survive the thermal cycling and vibration present in diesel particulate filter applications.

To accomplish this retained strength, it is generally necessary to retain at least 50 percent of the as mullitized strength. The as mullitized strength is the strength of the acicular mullite prior to any subsequent heat treatment. This is so, because the ability to have a sufficiently high as mullitized strength is severely limited by the high porosity necessary for a diesel particulate filter. The high porosity is necessary (that is, 55 percent or greater porosity and preferably at least 57 percent porosity) for the filter to perform without introducing, for example, excessive back pressure. Preferably, the retained strength is at least 70 percent, more preferably at least 85 percent, even more preferably at least 90 percent and most preferably at least 95 percent of the as mullitized strength. Surprisingly, the method of this invention may cause the retained strength to be equal to or greater than the as mullitized strength.

The composition, when used as a diesel particulate trap should have a retained strength that is adequate to survive a diesel particulate trap environment. Generally, the retained strength is at least 15 MPa. Preferably, the retained strength is at least 17 MPa, more preferably the retained strength is at least 19 MPa, even more preferably at least 20 MPa and most preferably at least 25 MPa. The retained strength is generally determined by 4 point bending of a bar cut from an extruded honeycomb that was subsequently mullitized. The strength measurement may be made using a known technique such as described by ASTM C1161.

The composition should be sufficiently porous (for example, at least 55 percent porous) to be useful as a diesel particulate filter, as previously described. However, the porosity must not be so great that the as mullitized strength, and consequently the retained strength, is so low that the filter breaks or fails to capture sufficient particulate matter (that is, at most 85 percent porous). Preferably, the porosity is at least 56 percent, more preferably at least 57 percent, even more preferably at least 60 percent and most preferably at least 62 percent to preferably at most 80 percent, more preferably at most 75 percent and most preferably at most 70 percent porous.

In addition, the mullite composition desirably has a permeability coefficient that is as high as possible to reduce back pressure buildup, while still retaining sufficient particles. The permeability coefficient is proportional, for example, to the total amount of porosity and size of the pores and inversely proportional to tortuousity of the interconnected porosity. Generally, the permeability coefficient should be at least $1 \times 10^{-13}$ m$^2$ as determined using Darcey's equation. Preferably, the permeability coefficient is at least $2 \times 10^{-13}$ m$^2$.

Even though the theoretical Al/Si mullite stoichiometry is 3 ($3Al_2O_3.2SiO_2$), the bulk Al/Si stoichiometry of the mullite composition may be any suitable stoichiometry, such as 4 Al/Si to 2 Al/Si. Bulk stoichiometry means the ratio of Al to Si in the body (that is, not each individual grain). It is preferred that the bulk stoichiometry of the body is less than 3, which correlates to an alumina ($Al_2O_3$) to silica ($SiO_2$) stoichiometry of less than 1.5. The Al/Si bulk stoichiometry preferably is at most 2.95, more preferably at most 2.9, even more preferably at most 2.85 and most preferably at most 2.8 to preferably at least 2. The bulk stoichiometry may be measured by any suitable techniques, such as those known in the art, including, for example, X-ray fluorescence.

Mullite compositions having an Al/Si bulk stoichiometry greater than 3.3 are less preferred since they may form distinct and separate small particles of alumina, which cause, for example, lowered permeability and greater initial back pressure and accelerated back pressure build up in diesel particulate trap applications. Mullite compositions having a bulk Al/Si near 3 (that is, the theoretical stoichiometry of mullite), even though typically lacking clogging alumina particles, are not as preferred as a lower bulk stoichiometry. This is so because the strength of mullite compositions having bulk Al/Si very near 3 or above are lower than mullite compositions having a lower bulk Al/Si stoichiometry. This strength disparity generally is more pronounced for compositions that are more porous (that is, greater than 55 percent porosity). The bulk stoichiometry may be determined by any suitable technique, such as those known in the art (for example, X-ray fluorescence).

It is desirable for the mullite body to have a bulk Al/Si stoichiometry of at most 2.95 to at least 2 and the mullite grains to have an Al/Si stoichiometry of at least 2.95. More preferably, the mullite grains have an Al/Si stoichiometry from 3 to 3.4. It has been surprisingly discovered that this preferable mullite composition using, for example, the method described herein forms an initially stronger mullite composition and retained strength than the composition having greater bulk stoichiometric ratios. It is not understood why compositions having a lower Al/Si bulk stoichiometry have a higher strength, but it may be due to the formation of a grain boundary glassy phase composed of a greater amount of silica that is essentially free of crystalline silica phases. That is to say, the composition contains at most 2 percent by volume of a silica crystalline phase, such as cristobalite. The amount or presence of these crystalline silica phases may be detected by X-ray diffraction or electron diffraction. Preferably, the composition contains at most 1 percent by volume, more preferably at most 0.5 percent by volume and most preferably, essentially no silica crystalline phases.

Generally, the as mullitized strength of acicular mullite having an Al/Si stoichiometry of at most 2.95 is at least 20 MPa. Preferably, the as mullitized strength is at least 25 MPa, more preferably at least 28 MPa, even more preferably at least 30 MPa, most preferably at least 32 Mpa, while having a porosity of at least 55 percent to at most 85 percent.

Because it is desirable to use clays to facilitate making a plastic mass for extruding honeycombs, the acicular mullite generally has some amount of impurities arising, at least in part, from the impurities present in the clay or clays used. Typically, the amount of impurities (that is, elements other than those present in the mullite formula shown above) present in the composition is generally at most 5 percent by weight of the body. Preferably, the total amount of impurities is at most 4 percent, more preferably at most 3 percent, even more preferably at most 2.5 percent and most preferably at most 2 percent. The amount of impurities may be determined by any suitable bulk analysis technique, such as those known in the art (for example, X-ray fluorescence).

If the mullite precursors contain impurities of magnesium and/or iron, the acicular mullite composition preferably is comprised substantially of acicular mullite grains that are essentially chemically bound, wherein the mullite composition has a glassy phase at the surface of the mullite grains, said glassy phase having iron and magnesium essentially incorporated into the glassy phase. The magnesium and iron are essentially incorporated into the glass phase when, at most, trace amounts of crystalline precipitates of Mg and/or Fe are detected by X-ray diffraction or electron diffraction. Preferably, crystalline Mg and/or Fe crystalline precipitates are undetectable by electron diffraction.

It is also desirable that the mullite composition is substantially free of fluorine. The heat-treatment of this invention also causes the fluorine to be reduced, while accomplishing the incorporation of the Mg and Fe into the glass. Typically, mullitized mullite contains 2 to 3 percent by weight of fluorine. Generally, the mullite composition, where the Mg and Fe are incorporated into the glass phase, has an amount of fluorine of at most 0.75 percent by weight of the composition. Preferably, the amount of fluorine is at most 0.5 percent, more preferably at most 0.25 percent, even more preferably at most 0.1 percent and most preferably at most a trace amount by weight in the mullite composition.

It has been discovered that iron and magnesium impurities in acicular mullite may form a crystalline precipitate, within the glass phase of an acicular mullite composition, for example, upon thermal cycling experienced in diesel particulate trap applications. These precipitates may be essentially incorporated into the glassy phase by the heat treatment described herein and are not reformed by thermally cycling. If the precipitates are present, the strength of the acicular mullite is reduced.

Forming the Mullite

In making the mullite composition, precursor compounds containing Al, Si and oxygen are mixed to form a mixture capable of forming mullite. Precursor compounds that may be used are described in U.S. Pat. Nos. 5,194,154; 5,198,007; 5,173,349; 4,911,902; 5,252,272; 4,948,766 and 4,910,172. The mixture may contain other compounds, such as fillers (particulates that do not react to form mullite, but are retained within the mullite after it is formed). The mixture may also contain organic compounds to facilitate the shaping of the mixture (for example, binders and dispersants, such as those described in *Introduction to the Principles of Ceramic Processing*, J. Reed, Wiley Interscience, 1988).

Generally, the mixture is comprised of clay (that is, hydrated aluminum silicate) and compounds such as, alumina, silica, aluminum trifluoride, fluorotopaz and zeolites. Preferably, the precursor compounds are selected from the group consisting of clay, silica, alumina and mixtures thereof. Most preferably, the mixture is comprised of clay and alumina.

In one method of this invention, the precursor compounds may be selected in proportions so that mullite may be made with any Al/Si bulk stoichiometry from 2 to 4, as described above. Preferably, the precursors are selected so that the mullite body has an Al/Si bulk stoichiometry of at most 2.95 to 2, as previously described. In a second method, the precursors are selected so that the mixture has a ratio of Al/Si that is at most 2.95. Preferably, the Al/Si ratio is at most 2.9, more preferably at most 2.85, and most preferably at most 2.8. It is understood herein that the Al/Si stoichiometry refers to the aluminum and silicon in the precursor that actually form the mullite composition. That is to say, if the fluorine source, for example, is $AlF_3$, the amount of $SiO_2$ present in the precursors for stoichiometry purposes must be reduced by an amount of $SiF_4$ that is volatalized off by the reaction of the fluorine from the $AlF_3$ with the $SiO_2$ to form $SiF_4$.

The mixture may be made by any suitable method such as those known in the art. Examples include ball milling ribbon blending, vertical screw mixing, V-blending and attrition milling. The mixture may be prepared dry (that is, in the absence of a liquid medium) or wet.

The mixture is then shaped into a porous shape by any suitable method, such as those known in the art. Examples include injection molding, extrusion, isostatic pressing, slip casting, roll compaction and tape casting. Each of these is described in more detail in *Introduction to the Principles of Ceramic Processing*, J. Reed, Chapters 20 and 21, Wiley Interscience, 1988.

In the method of the first aspect of the invention, the next step of the process is the heating of the porous green shape of step (b) under an atmosphere having fluorine and a temperature sufficient to form the mullite composition. Fluorine may be provided in the gaseous atmosphere from sources such as $SiF_4$, $AlF_3$, $HFNa_2SiF_6NaF$ and $NH_4F$. Preferably, the source of fluorine is from $SiF_4$.

In the method of the second aspect of the invention, the next step of the process is under an atmosphere having a fluorine containing gas that is separately provided and to a temperature sufficient to form the mullite composition. "Separately provided" means that the fluorine containing gas is supplied not from the precursors in the mixture (for example, $AlF_3$), but from an external gas source pumped into the furnace heating the mixture. This gas preferably is a gas containing $SiF_4$.

In either method, the porous body is preferably heated to a first temperature for a time sufficient to convert the precursor compounds in the porous body to fluorotopaz and then raised to a second temperature sufficient to form the mullite composition. The temperature may also be cycled between the first and second temperature to ensure complete mullite formation. The first temperature may be from 500° C. to 950° C. Preferably, the first temperature is at least 550° C., more preferably at least 650° C. and most preferably at least 725° C. to preferably at most 850° C., more preferably at most 800° C. and most preferably at most 775° C.

The second temperature may be any temperature suitable depending on variables such as the partial pressure of $SiF_4$. Generally, the second temperature is at least 1000° C. to at most 1700° C. Preferably, the second temperature is at least 1050° C., more preferably at least 1075° C. and most preferably at least 1100° C. to preferably at most 1600° C., more preferably at most 1400° C. and most preferably at most 1200° C.

Generally, during the heating to the first temperature, the atmosphere is inert (for example, nitrogen) or a vacuum until at least 500° C., which is when a separately provided fluorine containing gas is desirably introduced. During heating to the first temperature, organic compounds and water may be removed. These may also be removed in a separate heating step common in the art described in *Introduction to the Principles of Ceramic Processing*, J. Reed, Wiley Interscience, 1988. This separate heating step is commonly referred to as binder burnout.

With regard to the method of the first aspect of the invention, the untreated mullite of step (c) is heated to a heat treatment temperature of at least 950° C. under a heat treatment atmosphere selected from the group consisting of air, water vapor, oxygen, an inert gas and mixtures thereof, for a time sufficient to form the mullite composition. Examples of inert gases include nitrogen and the noble gases (that is, He, Ar, Ne, Kr, Xe, and Rn). Preferably, the heat treatment atmosphere is an inert gas, air, water vapor or mixture thereof. More preferably, the heat treatment atmosphere is nitrogen, air or air containing water vapor.

The time at the heat treatment temperature is a function of the heat treatment atmosphere and temperature selected. For example, a heat treatment in wet air (air saturated with water vapor at 40° C.) generally requires more than several hours to 48 hours at 1000° C. In contrast, ambient air, dry air or nitrogen (air having a relative humidity from 20 percent to 80 percent at room temperature) desirably is heated to 1400° C. for at least 2 hours.

Generally, the time at the heat treatment temperature is at least 0.5 hour and is dependent on the temperature used (that is, generally, the higher the temperature, the shorter the time may be). Preferably, the time at the heat treatment temperature is at least 1 hour, more preferably at least 2 hours, even more preferably at least 4 hours and most preferably at least 8 hours to preferably at most 4 days, more preferably at most 3 days, even more preferably at most 2.5 days and most preferably at most 2 days.

To ensure that any Mg and/or Fe impurities stay incorporated within the glassy phase of the acicular mullite, the heat treatment temperature is preferably at least 1000° C., more preferably at least 1050° C., even more preferably at least 1100° C. and most preferably at least 1200° C. to preferably at most 1700° C., more preferably at most 1600° C. and preferably at most 1550° C.

The mullite composition may be particularly useful as a support for a catalyst, such as precious metal catalyst on alumina particles, typically referred to as a catalyst wash coat, used in automotive catalytic converters. It is preferred that the mullite grains have an aspect ratio of at least 10. It is also preferred that the wash coat makes a thin coating on at least a portion of the mullite grains. A portion is generally when, at least 10 percent of the area of the grains of one region are covered by the catalyst coating. Preferably, substantially all of the grains of one region are coated. More preferably, substantially all of the grains of the composition are coated.

Thin coating means that the catalyst wash coating has a thickness generally less than the average smallest dimension of the grains coated. Generally, the thickness of the coating is at most half the thickness, preferably at most one third and most preferably at most one quarter the thickness of the average smallest dimension of the grains coated.

The composition may also be particularly useful as a particulate (soot) trap and oxidation (that is, exhaust) catalyst for mobile power applications (for example, diesel engines) and stationary power applications (for example, power plants). The mullite composition, when used as a diesel particulate trap, may have at least a portion of the mullite grains coated with a catalyst, as described above. Of course, the composition may be useful as soot trap itself without any catalyst.

EXAMPLES

Example 1

Bars were pressed from a precursor having an Al/Si stoichiometry of 2.65. The precursor was made by mixing 44 parts by weight (pbw) of ball clay (Todd Dark grade, Kentucky-Tennessee Clay Company, Mayfield, Ky.) with 56 pbw of kappa-alumina, 287 parts by weight of a 7 percent by weight of hydroxypropyl methylcellulose in water solution (METHOCEL J75MS-N, The Dow Chemical Co., Midland, Mich.), 3 pbw glycerol and 190 pbw of deionized water. The slurry pH was then adjusted to 10.4 using tetramethylammonium hydroxide. The ball clay was dried for 48 hours at 110° C. before use. The kappa-alumina was prepared by heating aluminum hydroxide (P3 gibbsite, Alcoa, Pittsburgh, Pa.) to 1000° C. for 1 hour. The bars were bisque-fired to remove the organic binder (that is, METHOCEL) and to dehydrate the clay by heating to 1100° C. in 10 hours, holding at 1100° C. for 1 hour, then cooling in 5 hours.

The bisque-fired bars were then placed in a quartz tube reactor lined with nickel foil contained within a furnace. The bars were heated under vacuum to 720° C. At this point, $SiF_4$ gas was introduced into the reactor at a rate of 0.44 sccm per gram of sample until the pressure in the tube was 600 torr (80 KPa). The reactor was then heated at 3° C. per minute to 995°. When the reactor reached 850° C., the $SiF_4$ pressure was reduced to 300 torr (40 KPa) and maintained at this pressure. When the reactor reached 995° C., the heating rate was reduced to 1° C. per minute. Heating continued, while maintaining the reactor pressure at 300 torr (80 KPa) until the reactor temperature had reached 1120° C. When the evolution of $SiF_4$ substantially ceased, the reactor was evacuated and cooled to ambient temperature. The bars were then heated to 1400° C. for two hours in air.

The average strength of the bars, as determined by 4 point bend (ASTM C-1161), was 28 MPa. The average porosity of the bars, as determined by measuring the weight and dimensions of the bars, was 68 percent. These data, as well as the pressing pressure to make the bars, are shown in Table 1.

Examples 2 and 3

Examples 2 and 3 were made in the same way as Example 1, except that the Al/Si ratio and/or pressing pressure used were varied as shown in Table 1. The strength and porosity are shown in Table 1.

Comparative Examples 1 and 2

Bars were made in the same manner as described in Example 1, except that the Al/Si ratio was varied as well as the pressing pressure, as shown in Table 1. The porosity and as mullitized strength of these Comparative Examples are shown in Table 1. The heat treated (that is, heated to 1400° C. after being mullitized) strength data show that acicular mullite compositions having a stoichiometry of less than or equal to 2.95, have substantially improved strengths compared to those having Al/Si stoichiometries greater than 2.95 at a given porosity.

The data in Table 2 show that a heat treatment to temperatures in excess of 1000° C. (Examples 5 and 6 compared to Example 4) further improved the retained strength of an acicular mullite. Table 2 also shows that a honeycomb of acicular mullite having an Al/Si ratio of 2.95 may have a high porosity and high strength.

TABLE 1

Effect of Al/Si Stoichiometry on Strength

| Example | Al/Si Stoichiometry | Porosity (percent) | Pressing Pressure (psi) | Strength (MPa) |
|---|---|---|---|---|
| Example 1 | 2.65 | 69 | 2000 | 28 |
| Example 2 | 2.9 | 70 | 2000 | 26 |
| Example 3 | 2.9 | 68 | 3500 | 28 |
| Comp. Example 1 | 3.15 | 71 | 3500 | 10 |
| Comp. Example 2 | 3.4 | 70 | 3500 | 9 |

TABLE 2

Effect of Heat Treatment on Retained Strength

| Example | Al/Si Ratio | Porosity (percent) | As Mullitized Strength (MPa) | Heat Treat Temp. (° C.) | Heat Treat Time (H) | Heat Treatment Atmosphere | Presence of Precipitates | Retained Strength (MPa) | Elastic Modulus (GPA) |
|---|---|---|---|---|---|---|---|---|---|
| 4 | 2.95 | 57 | 42.9 | N/A | N/A | N/A | Yes | 28.7 | 29.2 |
| 5 | 2.95 | 57 | 42.9 | 1400 | 2 | ambient air | | 35.0 | 29.6 |
| 6 | 2.95 | 57 | 42.9 | 1400 | 2 | nitrogen | | 35.5 | 28.1 |

Example 4

A honeycomb was formed from a precursor having an Al/Si stoichiometry of 2.95. The honeycomb was 5.6 inches (14.224 cm) in diameter and 6 inches (15.24 cm) long with a cell density of 175 cells per square inch (cpsi) (27 cells per $cm^2$). The precursor was made by mixing 51 parts by weight of ball clay (Todd Dark grade) with 49 parts by weight of kappa-alumina. The ball clay was dried for 48 hours at 110° C. before use. The kappa-alumina was prepared by heating aluminum hydroxide to 1000° C. for 1 hour. Water and organic binders were added to the mixture of ball clay and alumina to form an extrudable material. The extruded honeycomb was debindered and calcined for 1 hour at 1100° C.

The debindered and calcined honeycomb was placed in a quartz tube reactor and processed under similar conditions as described in Example 1.

Two inch (5.08 cm) long by 2 cell by 5 cell bars were cut out of the honeycomb and the strength tested in a similar manner, as the bars described in Example 1. The average strength of six of the bars was 42.9 MPa (as mullitized strength). Six bars were further heat treated to 800° C. in air for 2 hours and the average strength of these bars was 28.7 MPa (retained strength). The average porosity bars were determined by weight and dimension measurements. The average porosity was 57 percent. These data, as well as the elastic modulus, is shown in Table 2.

Examples 5 and 6

Bars were cut out of the same honeycomb of Example 4 and were heat treated as shown in Table 1 prior to heating in air to 800° C. in air for 2 hours. The retained strength of these bars is shown in Table 2.

What is claimed is:

1. A porous mullite composition comprised of at least 90 percent by volume of acicular mullite grains that are essentially chemically bound, wherein the mullite composition has a bulk Al/Si stoichiometry of at most 2.95 to at least 2 and the acicular mullite grains have an Al/Si ratio of at least 2.95 and the mullite composition has at most 2 percent by volume of a crystalline silica phase and a glassy phase distributed on at least a portion of the mullite grains wherein the glassy phase is comprised of silica, magnesium, and iron.

2. A diesel particulate trap comprised of the mullite composition of claim 1.

3. A diesel particulate trap of claim 2 wherein the mullite composition has a catalyst thereon.

4. An automotive catalytic converter comprised of the mullite composition of claim 1.

5. The mullite composition of claim 1 wherein the mullite composition has a retained strength, after heating to 800° C. for 2 hours in air, of at least 15 MPa and a porosity of at least 55 percent to at most 85 percent.

6. The mullite composition of claim 5 wherein the mullite composition has essentially zero crystalline silica phases.

7. A diesel particulate trap comprised of the mullite composition of claim 5.

8. An automotive catalytic converter comprised of the mullite composition of claim 5.

9. The mullite composition of claim 5 wherein the porosity is at most 75 percent.

10. The mullite composition of claim 9 wherein the retained strength is at least 17 MPa.

11. The mullite composition of claim 10 wherein the retained strength is at least 19 MPa.

12. The mullite composition of claim 11 wherein the retained strength is at least 25 MPa.

13. A mullite composition comprised of at least 90 percent by volume of acicular mullite grains that are essentially chemically bound, wherein the mullite composition has a glassy phase distributed on at least a portion of the acicular mullite grains, said glassy phase having iron and magnesium essentially incorporated into the glassy phase, wherein the mullite composition has an amount of fluorine of at most 1 percent by weight of the mullite composition.

14. A diesel particulate trap comprised of the mullite composition of claim 13.

15. A diesel particulate trap of claim 14 wherein the mullite composition has a catalyst thereon.

16. An automotive catalytic converter comprised of the mullite composition of claim 13.

17. The mullite composition of claim 13 wherein the amount of fluorine is at most 0.5 percent.

18. The mullite composition of claim 17 wherein the amount of fluorine is at most 0.1 percent.

19. The mullite composition of claim 18 wherein there is at most trace amounts of fluorine.

20. The mullite composition of claim 13 wherein the mullite composition has a porosity of 55 percent to 85 percent.

21. A diesel particulate trap comprised of the mullite composition of claim 20.

22. An automotive catalytic converter comprised of the mullite composition of claim 20.

23. The mullite composition of claim 20 wherein the porosity is at least 57 percent to at most 75 percent.

24. The mullite composition of claim 23 wherein the mullite composition has a retained strength, after heating in air to 800° C. for 2 hours, of at least 15 MPa.

* * * * *